(12) United States Patent
Kasamatsu

(10) Patent No.: US 9,158,403 B2
(45) Date of Patent: Oct. 13, 2015

(54) ELECTRONIC DEVICE INCLUDING TOUCH PANEL AND CONTROL METHOD OF ELECTRONIC DEVICE INCLUDING TOUCH PANEL

(71) Applicant: CANON KABUSHIKI KAISHA, Tokyo (JP)

(72) Inventor: Takehiko Kasamatsu, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 13/973,634

(22) Filed: Aug. 22, 2013

(65) Prior Publication Data

US 2014/0071085 A1 Mar. 13, 2014

(30) Foreign Application Priority Data

Sep. 13, 2012 (JP) .................. 2012-202012

(51) Int. Cl.
    *G06F 3/044* (2006.01)
    *G06F 3/041* (2006.01)

(52) U.S. Cl.
    CPC ............... *G06F 3/041* (2013.01); *G06F 3/044* (2013.01); *G06F 3/0418* (2013.01)

(58) Field of Classification Search
    CPC .......... G06F 3/044; G06F 2203/04111; G06F 2203/04112

USPC .......... 345/173, 174; 178/18.01, 18.03, 18.06
See application file for complete search history.

(56) References Cited

U.S. PATENT DOCUMENTS

| 2008/0048990 A1* | 2/2008 | Cho et al. ............... 345/173 |
| 2011/0210942 A1 | 9/2011 | Kitamori et al. |
| 2013/0021293 A1* | 1/2013 | Nakai ..................... 345/174 |

FOREIGN PATENT DOCUMENTS

| JP | 2011-198359 A | 10/2011 |
| WO | WO 2011108257 A1 * | 9/2011 |

* cited by examiner

*Primary Examiner* — Stephen Sherman
(74) *Attorney, Agent, or Firm* — Fitzpatrick, Cella, Harper & Scinto

(57) ABSTRACT

Capacitances caused by respective electrodes of a touch panel, which is used to detect an instruction position of the user based on a change in capacitance, are measured, and it is determined whether or not a difference between the measured value and a reference value is larger than a threshold. When it is determined that the difference is larger than the threshold, a portion corresponding to the electrode on the touch panel is detected as the instruction position of the user. After detection, when the difference continues for a predetermined period time, the measured value is set as a new reference value.

7 Claims, 19 Drawing Sheets

X COORDINATE 1 2 3 4 5 6 7 8 9 10 11 12 13 14

5mm

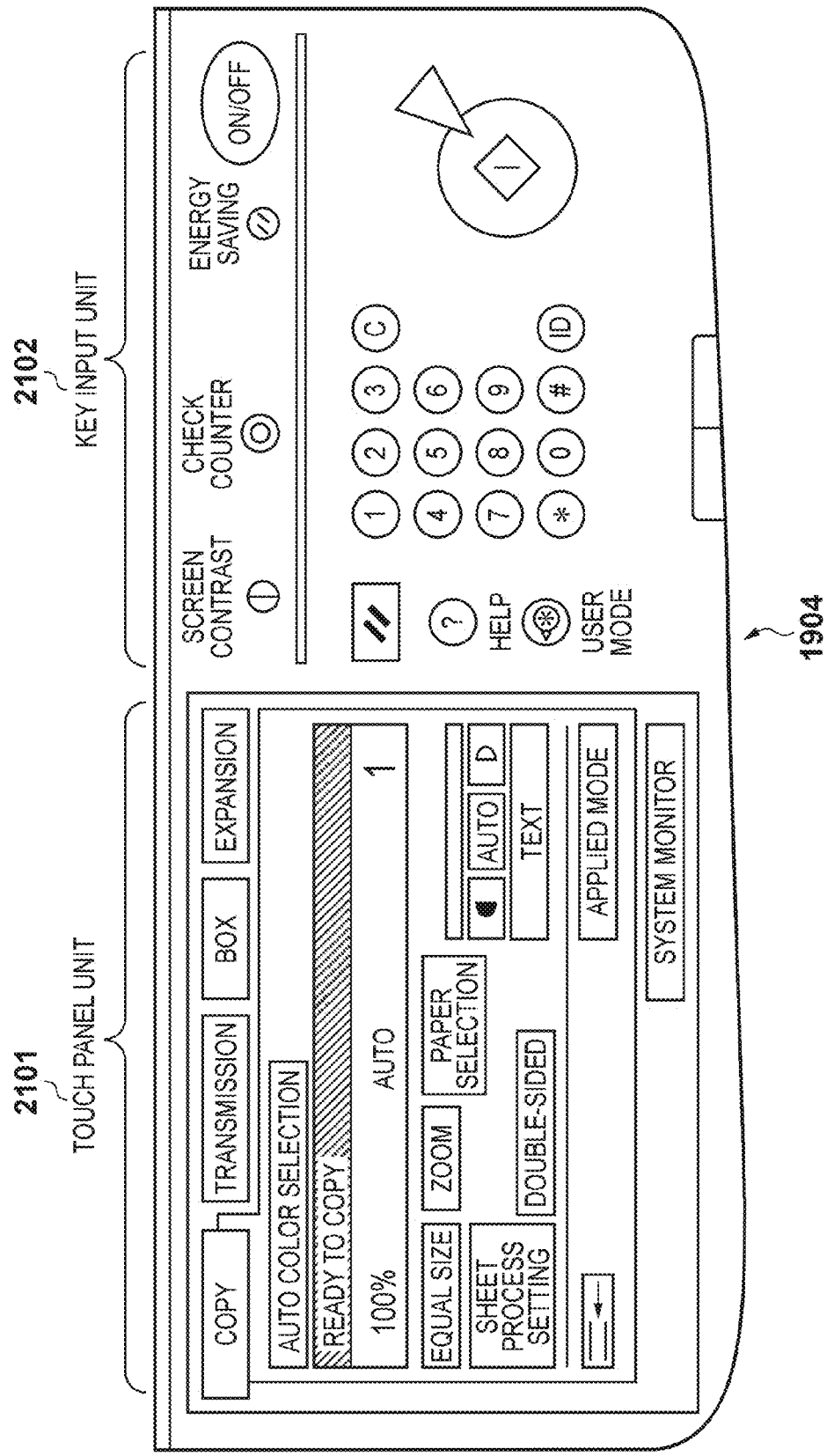

ND TOUCH
ELECTRONIC DEVICE INCLUDING TOUCH PANEL AND CONTROL METHOD OF ELECTRONIC DEVICE INCLUDING TOUCH PANEL

BACKGROUND OF THE INVENTION

1. Field of the Invention

The present invention relates to an electronic device including a capacitance type touch panel and a control method of an electronic device including a capacitance type touch panel.

2. Description of the Related Art

As a user interface of an electronic device, a capacitance type touch panel is often used. The touch panel type includes various types, that is, a resistive film type, infrared type, and the like, and a capacitance type is normally adopted due to its convenience.

In a capacitance type touch panel a plurality of electrostatic sensor patterns are formed using transparent electrodes made up of ITO (Indium Tin Oxide) or the like. In general, an increase in capacitance value of an electrostatic sensor pattern at a touch position of the user's finger or the like on the touch panel is detected compared to that of a non-operation, and the presence/absence of a touch operation is determined based on the increase in capacitance value.

When a capacitance value in a non-operation state, which value is used as a reference value, is unwantedly changed due to the influence of an ambient temperature or the like, a touch operation cannot often be accurately determined. Japanese Patent Laid-Open No. 2011-198359 describes an arrangement in which a fan is arranged to blow air between a liquid crystal panel and touch panel, and is controlled to cool the liquid crystal panel and touch panel. With this arrangement, the ambient temperature of the touch panel is controlled to be constant, thus preventing erroneous operations. However, addition of the fan used to cool the touch panel results in an increase in device size and that in cost, and the following problem may also be posed.

Each electrostatic sensor (electrostatic sensor pattern) used to measure a capacitance normally uses a cover lens and the like on an operation portion operated by a user. In general, in order to adhere the cover lens and a sheet on which each electrostatic sensor pattern is arranged, they are fixed using an adhesive sheet or the like. Based on the premise that a touch panel operation is a single-finger operation, in case of a relatively small touch panel, when the user touches the entire touch panel by the palm or the like, a portion of that touch operation cannot be determined, and processing for invalidating that operation itself is executed because an operation is made on a region larger than expected.

However, the temperature of the palm of the user is normally higher than that of the touch panel, and when a touch state of the palm on the entire touch panel continues for a long period of time, the entire touch panel is heated by the palm. As a result, dielectric constants of materials such as the cover lens and adhesive in the vicinity of the electrostatic sensor pattern are changed unwantedly. In such case, when the palm is released, the capacitance of the electrostatic sensor pattern is not equal to that before the touch panel is touched by the palm due to the influences of surrounding materials whose dielectric constants are changed, and a capacitance in a non-operation state is undesirably larger than that before the touch panel is touched by the palm. That is, although the palm is released, the touch panel may be erroneously judged as an operation state, and an erroneous operation of the device itself and a user operation disabled state unwantedly continues for a long period of time.

FIG. 10 shows a change in capacitance of an electrostatic sensor pattern when the palm is placed on the touch panel for a long period of time. As indicated by an interval A, when the touch panel is touched by the palm, a capacitance increases abruptly. After that, while the touch panel is being touched by the palm, the dielectric constant around the electrostatic sensor pattern changes due to the temperature of the palm, and the capacitance increases gradually. After that, when the hand is released from the touch panel, the capacitance of the palm decreases abruptly, but it raised by the temperature of the palm does not abruptly return. Therefore, the capacitance assumes a value larger than that before the touch panel is touched by the palm, and returns to an original capacitance value as the temperature of the touch panel decreases gradually. In control for determining the presence of a touch operation when an increase in capacitance beyond a predetermined threshold is detected, before the temperature returns to an original temperature, although no touch operation is actually made, it is erroneously determined that the touch panel is operated.

SUMMARY OF THE INVENTION

An aspect of the present invention is to eliminate the above-mentioned problems with the conventional technology. The present invention provides a display device which can prevent any determination error of a touch operation when an improper touch operation is made, and a touch panel control method.

The present invention in its first aspect provides an electronic device comprising: a touch panel having a plurality of electrodes; a measurement unit configured to measure capacitances respectively caused by the plurality of electrodes; and a control unit configured to re-set, in a case where a number of electrodes, for which it is determined that a difference between each measured value by the measurement unit and a reference value is larger than a threshold, is larger than a predetermined number of electrodes, and a state in which the difference is larger than the threshold continues for a predetermined time period, the reference value according to the measured value.

According to the present invention, when an improper touch operation is made, any determination error of a touch operation can be prevented.

Further features of the present invention will become apparent from the following description of exemplary embodiments with reference to the attached drawings.

BRIEF DESCRIPTION OF THE DRAWINGS

FIG. 21 is a view showing an example of an operation unit of the MFP.

DESCRIPTION OF THE EMBODIMENTS

Figure 1:
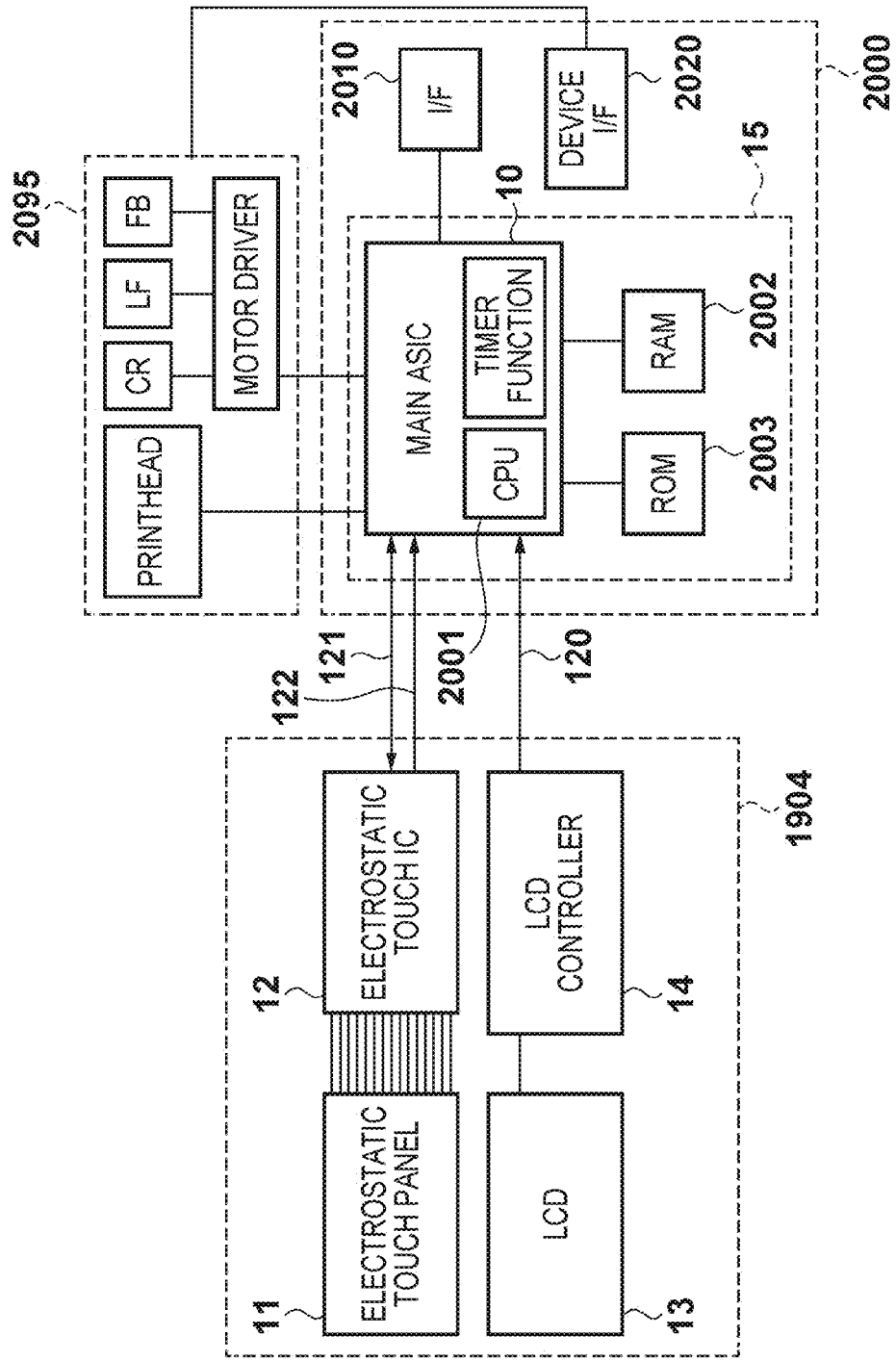
FIG. 1 is a block diagram showing the block arrangements of an operation unit, controller unit, and printer in more detail.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a description thereof will not be repeated.

[First Embodiment]

This embodiment will explain an MFP (Multi Function Peripheral) as an example of an electronic device using, as a user interface, a capacitance type touch panel. The MFP has a plurality of functions such as a copy function of optically scanning a document or the like, and forming and printing an image on a recording medium based on that scan data, and a print function of recording an image on a recording medium based on image data received via a network.

Figure 19:
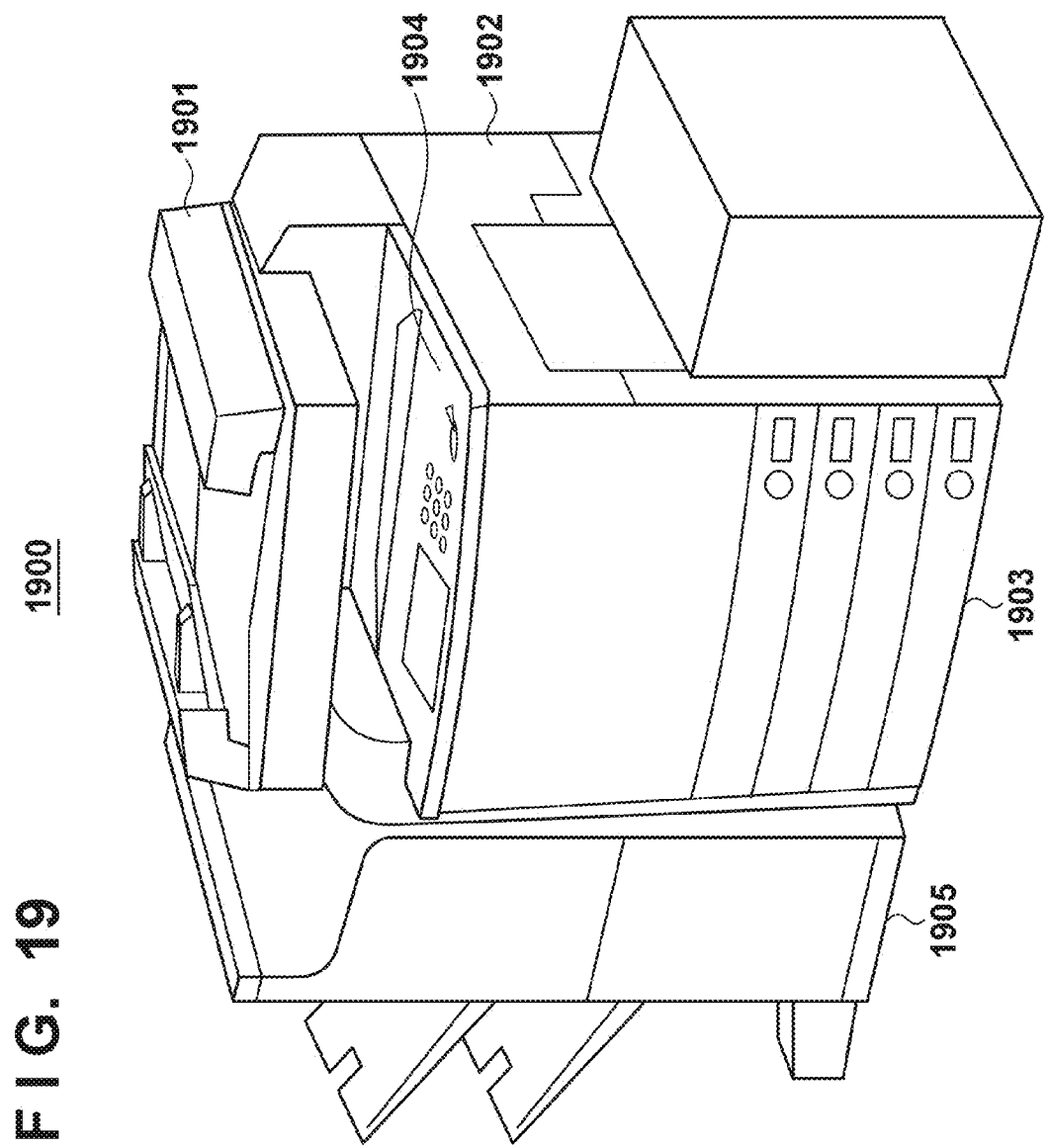
FIG. 19 is a view showing the outer appearance of an MFP.

FIG. 19 shows the outer appearance of an MFP 1900. A scanner 1901 optically scans a document image by irradiating a document (recording medium) placed on a platen with light, and converts an optical image into an electrical signal, thereby generating image data. A main body 1902 includes a printer (not shown), and a controller unit used to control the scanner and printer. A paper feed unit 1903 includes a cassette used to store recording media such as paper sheets recorded by the printer. An operation unit 1904 includes a touch panel according to this embodiment, and function buttons used by the user to issue execution instructions of respective functions. A paper discharge unit 1905 discharges a recording medium on which an image is recorded by the copy function or print function onto an discharge tray.

Figure 20:
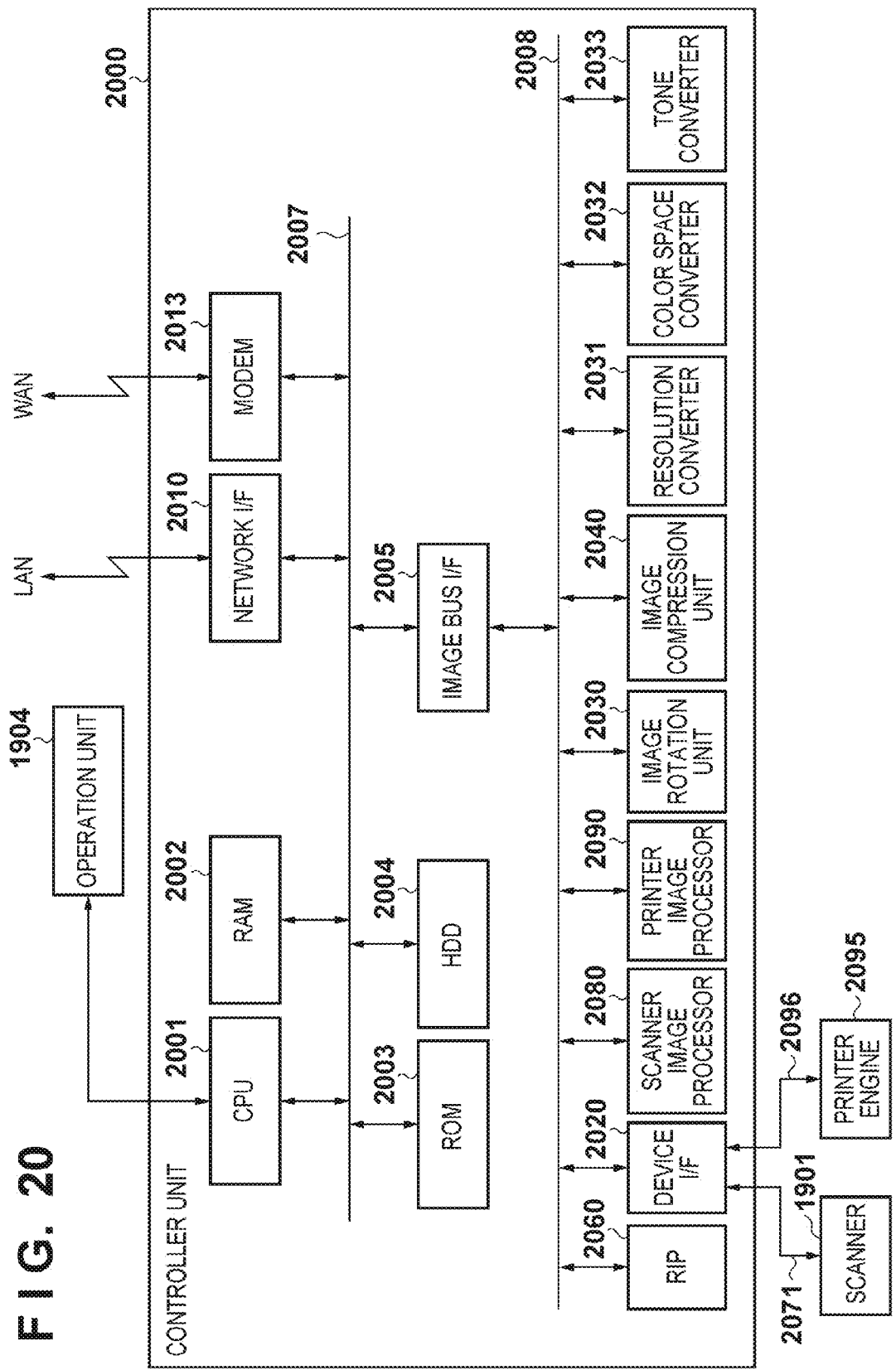
FIG. 20 is a block diagram for explaining the internal arrangement of the MFP.

FIG. 20 is a block diagram for explaining the internal arrangement of the MFP 1900. A controller unit 2000 is connected to a scanner 1901 as an image input device and a printer 2095 as an image output device. Then, the controller unit 2000 exchanges image information and device information by connecting a LAN or public line (WAN). A CPU 2001 is a controller which controls the overall system. A RAM 2002 is a system work memory required for the operation of the CPU 2001, and is also an image memory used to temporarily store image data.

A ROM 2003 is a boot ROM, and stores a boot program of the system. An HDD 2004 is a hard disk drive, and stores image data and software modules. A network interface 2010 is connected to the LAN to exchange information. A modem 2013 is connected to the public line to exchange image information.

The aforementioned devices are connected on a system bus 2007. An image bus I/F 2005 is a bus bridge, which connects the system bus 2007 and an image bus 2008 which transfers image data at high speed and converts data structures. On the image bus 2008, the following devices are connected.

A raster image processor (RIP) 2060 rasterizes PDL code data into bitmap image data. A device I/F 2020 connects the scanner 1901 and printer 2095 as the image input/output devices to the controller unit 2000. A scanner image processor 2080 corrects, processes, and edits input image data.

A printer image processor 2090 corrects, processes, and edits output image data. An image rotation unit 2030 rotates an image and stores the rotated image on a memory simultaneously with scanning of the image from the scanner 1901 in cooperation with the scanner image processor, or rotates an image on the memory and stores the rotated image on the memory again. Alternatively, the image rotation unit 2030 can print an image on the memory while rotating that image in cooperation with the printer image processor 2090.

A resolution converter 2031 applies resolution conversion processing to an image on the memory, and stores the converted image on the memory. A color space converter 2032 converts, for example, a YUV image on the memory into an Lab image by matrix calculations, and stores the converted image on the memory. A tone converter 2033 converts, for example, an 8-bit, 256-tone image on the memory into a 1-bit, 2-tone image by an error diffusion processing method or the like, and stores the converted image on the memory. An image compression unit 2040 applies compression/decompression processing such as JPEG to multi-valued image data, and applies compression/decompression processing such as JBIG, MMR, MR, or MH to binary image data.

FIG. 21 is a view showing an example of the operation unit 1904 of the MFP 1900. As shown in FIG. 21, the operation unit 1904 includes a key input unit 2102 which can accept user operations via hardware keys, and a touch panel unit 2101 which can accept user operations via software keys. The key input unit 2102 includes a power switch of the operation unit 1904, and a start key used to start job processing of a type designated by the user such as a copy operation or transmission operation of a job to be processed. Also, the key input unit 2102 includes a stop key used to control a printer to interrupt processing of an accepted job, a numerical keypad which allows the user to make various numerical settings, a clear key used to clear various parameters such as numerical values set by the user, and the like.

The touch panel unit 2101 displays setting screens of respective functions which can be executed by the MFP 1900, and can accept a user's touch operation on a touch panel. In this embodiment, the touch panel unit 2101 includes a capacitance type touch panel. The touch panel unit 2101 displays, for example, icons (software keys) "magnification", "paper selection", and the like for the copy function. The user presses each of the displayed icons on the touch panel, thus executing a corresponding instruction.

FIG. 1 is a block diagram showing the block arrangements of the operation unit 1904, controller unit 2000, and printer 2095 in more detail. An electrostatic touch panel 11 is a capacitance type projection touch panel used as a user interface. An electrostatic touch IC 12 measures a capacitance of the electrostatic touch panel 11, and sets various flags (to be described later) by checking whether or not the user makes a touch operation on the electrostatic touch panel 11 based on the measured capacitance. Also, the electrostatic touch IC 12 determines whether or not user's touch operation is normal. An LCD 13 is arranged on the lower surface of the electrostatic touch panel 11, and an LCD controller 14 controls to drive the LCD 13. In FIG. 1, a main ASIC 10 including the CPU 2001, the ROM 2003, the RAM 2002, and a network interface 2010 will be collectively referred to as a main control unit 15 hereinafter.

The main control unit 15 controls the overall MFP 1900. The main control unit 15 includes the ASIC 10 which incorporates the CPU 2001 and a timer function, the ROM 2003 which stores a program required to operate the overall device, the RAM 2002 as a memory area required to operate the CPU 2001, and the like. The printer 2095 includes a printhead required to make a print operation, a carriage motor used to move the printhead to a print position, an LF motor used to operate a mechanism for discharging and feeding a paper sheet to be printed, and an FB motor used to operate a scanning unit of the scanner. The printer 2095 operates these devices via motor drivers in accordance with signals transferred from the main control unit 15 via the device I/F 2020.

The main control unit 15 transfers display screen data to the LCD controller 14 via a signal line 120, thereby executing display control of a screen to be displayed on the LCD 13. The main control unit 15 and electrostatic touch IC 12 are connected via a signal line 121. The main control unit 15 can output an operation instruction of calibration (to be described later) or the like to the electrostatic touch IC 12 and can read out state information of the electrostatic touch IC 12. The state information of the electrostatic touch IC 12 is status information of each of respective flags held in the electrostatic touch IC 12, as will be described later. Also, the electrostatic touch IC 12 notifies the main control unit 15 of a change in state information of the electrostatic touch IC 12 via an interrupt signal line 122. The main control unit 15 detects a state of a user's touch operation in accordance with the state of the electrostatic touch IC 12 via the signal line 121, and controls the respective units shown in FIG. 20 so as to execute respective functions of the MFP 1900 such as switching of the screen of the LCD 13 and printer in correspondence with the state of the touch operation.

Figure 2:
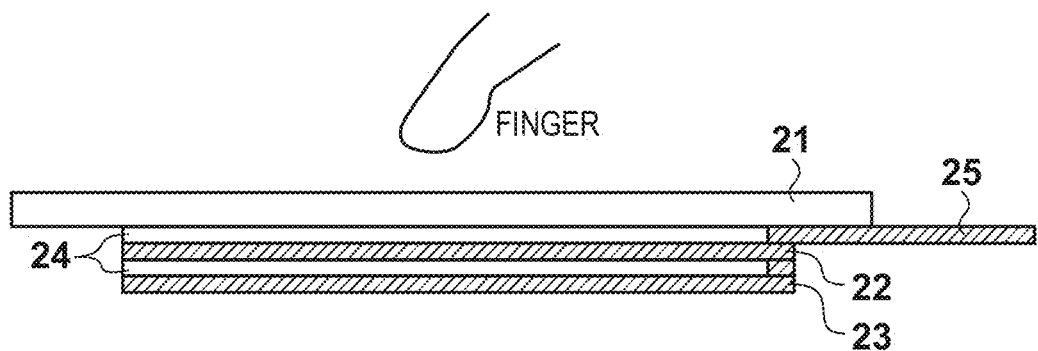
FIG. 2 is a sectional view of an electrostatic touch panel.

FIG. 2 is a sectional view of the electrostatic touch panel 11. A cover lens 21 is a portion as a user interface where a human body such as the finger touches. A sheet 22 is an X-direction detection sheet, and a sheet 23 is a Y-direction detection sheet. On these sheets, a plurality of electrostatic sensors (to be referred to as electrostatic sensor patterns) of transparent electrodes used to measure capacitances are arranged. Adhesive layers 24 adhere the cover lens 21 and sheet 22, and the sheets 22 and 23 to each other. Although not shown, the plurality of electrostatic sensor patterns arranged on the sheets 22 and 23 are connected to a copper pattern on each sheet. Also the sheets 22 and 23 are connected to an FPC 25 used to connect a connector of a circuit board or the like.

Figure 3:
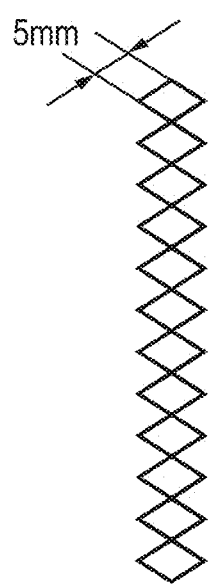
FIG. 3 is a view showing a shape of a transparent electrode pattern used to detect an X direction.
Figure 4:
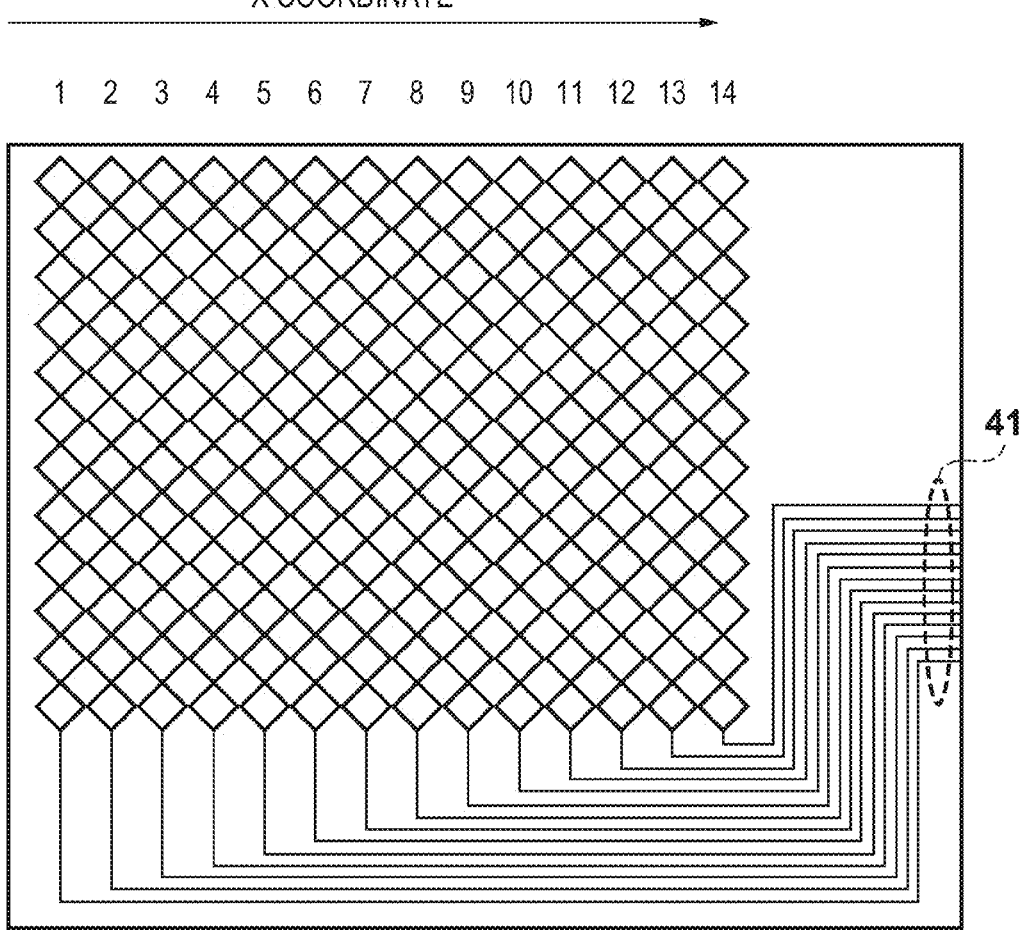
FIG. 4 is a view showing an X-coordinate detection sheet.
Figure 5:
FIG. 5 is a view showing a shape of a transparent electrode pattern used to detect a Y direction.
Figure 6:
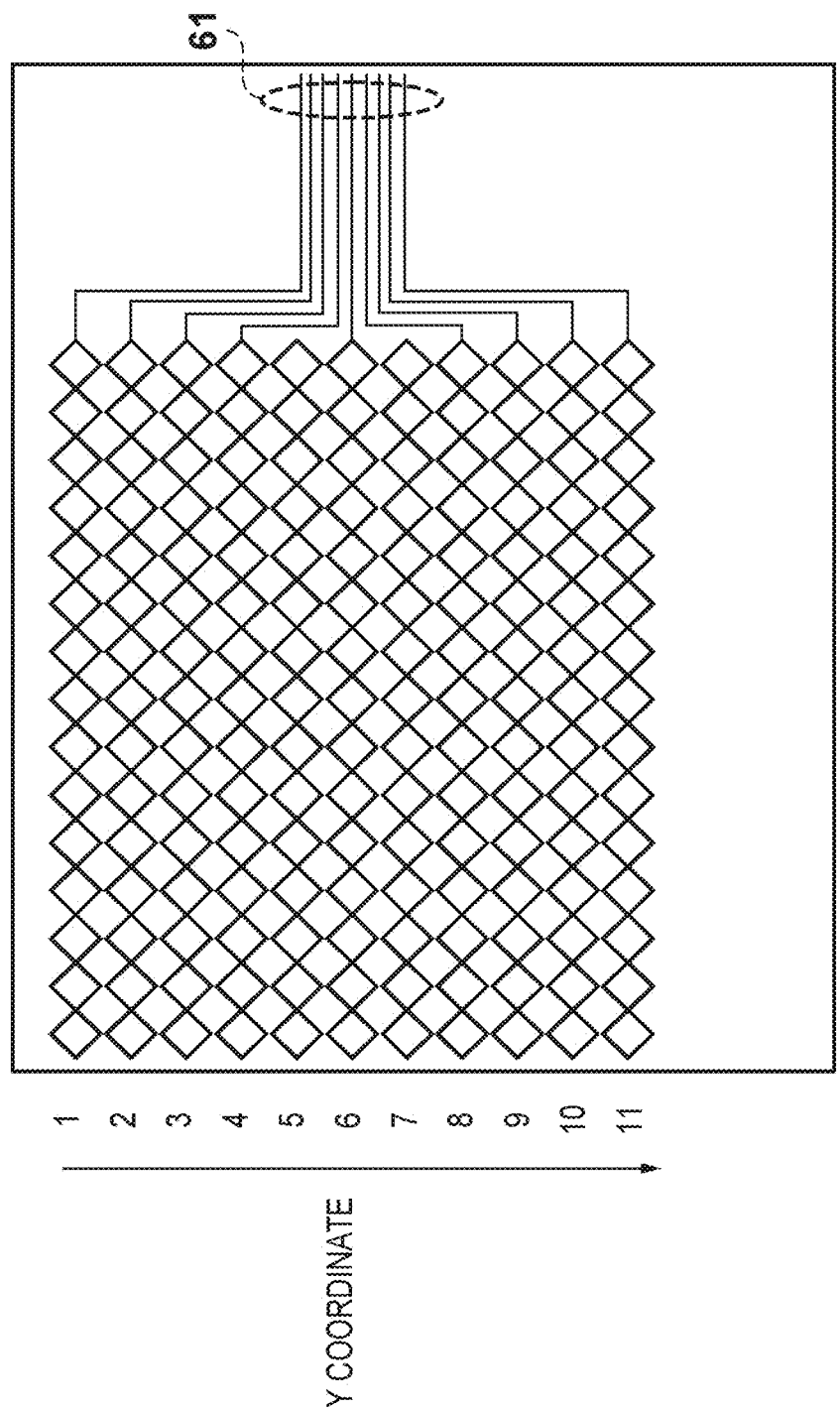
FIG. 6 is a view showing a Y-coordinate detection sheet.

FIG. 3 shows a shape of a transparent electrode pattern formed on the sheet 22 used to detect an X direction. Five-mm square rhombic patterns are vertically connected to define an electrostatic sensor pattern (in another expression, a conductive pattern). FIG. 4 shows the X-coordinate detection sheet 22 on which 14 conductive patterns shown in FIG. 3 are arranged horizontally. A pattern 41 indicates a copper pattern connected to transparent electrodes. FIG. 5 is a view similarly showing an electrostatic sensor pattern which is defined by horizontally connecting 5-mm square rhombic patterns so as to detect a Y direction and is formed on the sheet 23. FIG. 6 shows the Y-coordinate detection sheet 23 defined by vertically arranging 11 patterns shown in FIG. 5. A pattern 61 indicates a copper pattern connected to transparent electrodes. As described above, the electrostatic sensor patterns shown in FIGS. 4 and 6 assume roles of electrostatic sensors.

Figure 7:
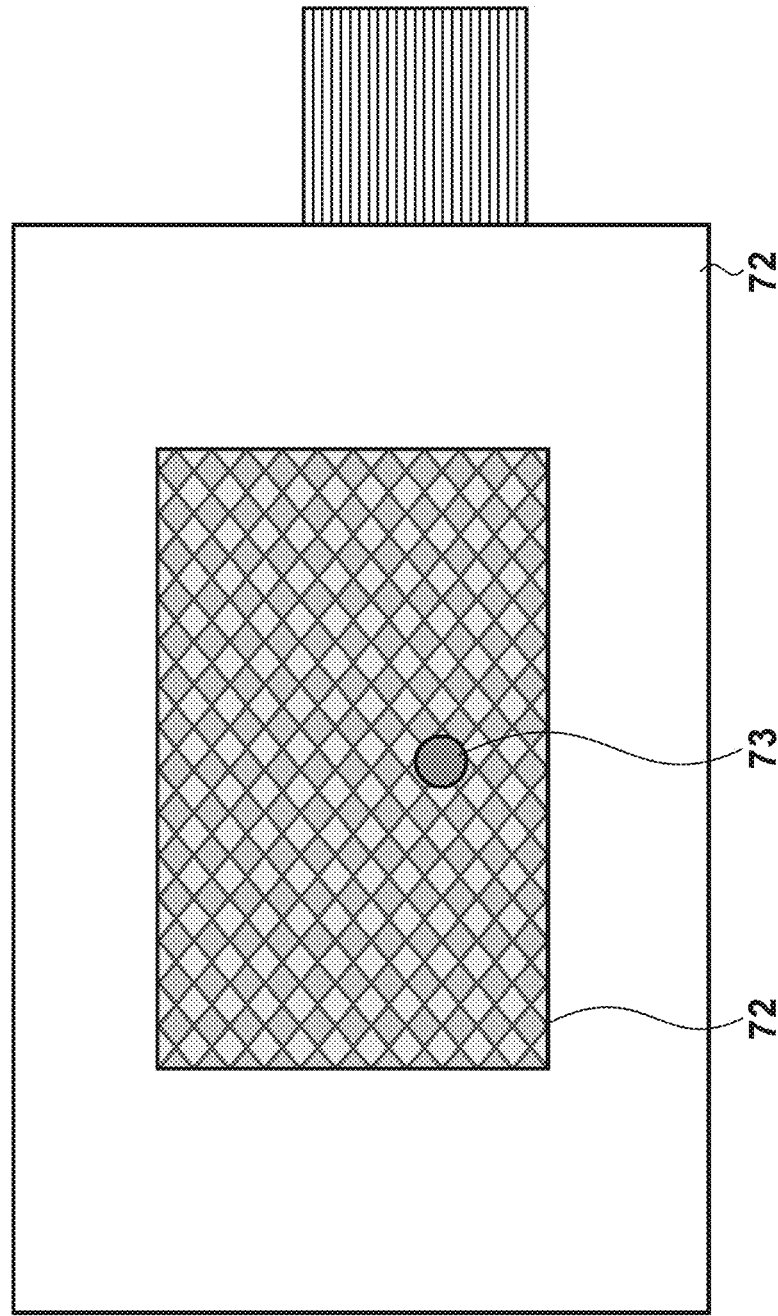
FIG. 7 is a front view of the electrostatic touch panel.

FIG. 7 is a front view of the electrostatic touch panel 11. On a region 71, transparent electrodes (electrostatic sensor patterns) are arranged. Gray portions in the region 71 indicate the electrostatic sensor patterns which are arranged on the sheet 22 and are used to detect an operation in the X direction, and white portions indicate the electrostatic sensor patterns which are arranged on the sheet 23 and are used to detect an operation in the Y direction. These portions are arranged so as not to overlap each other. A region 72 is a colored portion of the cover lens 21, and a portion where no electrostatic sensor patterns are arranged, that is, a region outside an operation range of the electrostatic touch panel 11. An instruction position 73 indicates an image when the user touches the electrostatic touch panel 11 with the finger so as to make an instruction operation. The instruction position 73 assumes a circle having a diameter of about 9 mm as a contact range, and has a size which can increase capacitances of electrodes for two or three X- and Y-coordinate detection electrostatic sensor patterns. When the user touches the region 71 by the palm or the like, almost all the X- and Y-coordinate detection electrostatic sensor patterns unwantedly react.

Figure 8:
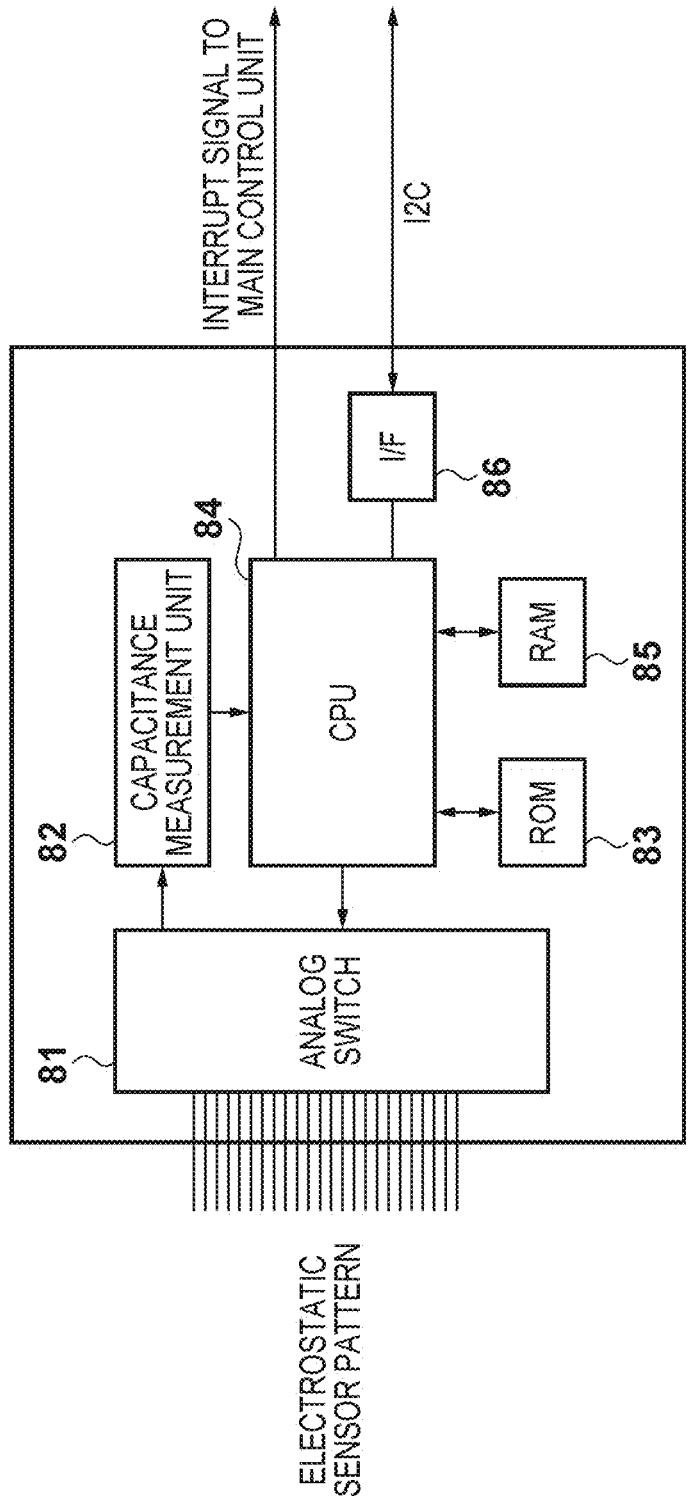
FIG. 8 is an internal block diagram of an electrostatic touch IC.

FIG. 8 is an internal block diagram of the electrostatic touch IC 12. The electrostatic touch IC 12 determines the presence/absence of a touch operation on the electrostatic touch panel 11, and also whether or not a normal touch operation is made. Furthermore, when the electrostatic touch IC 12 determines that a normal touch operation is made, it calculates position coordinates where the touch operation is made. An analog switch 81 is connected to the copper pattern 41 in FIG. 4 and the copper pattern 61 shown in FIG. 6. Thus, the analog switch 81 is connected to capacitance detection patterns of 14 X-coordinate detection signal lines and 11 Y-coordinate detection signal lines from the electrostatic touch panel 11. A capacitance measurement unit 82 detects capacitances, and measures capacitances caused by electrodes corresponding to signal lines selected by the analog switch 81. A ROM 83 incorporates a program required to operate a CPU 84 for controlling the electrostatic touch IC 12. A RAM 85 is used as a work area of the CPU 84, and a storage area of the measured capacitances and the like. An interface 86 is used to mutually communicate with the main control unit 15.

The electrostatic touch IC 12 detects the capacitances of the electrostatic touch panel 11, and then determines the presence/absence of a user operation on the electrostatic touch panel 11 and the presence/absence of an improper touch operation. When the electrostatic touch IC 12 detects a touch operation on the electrostatic touch panel 11, which is not an improper touch operation, it calculates and holds position coordinates where the touch operation is made. The electrostatic touch IC 12 notifies the main control unit 15 of a change in operation state with respect to the electrostatic touch panel 11 via the interrupt signal line 122. As will be described later, a change in operation state means a change in state of each flag held by the electrostatic touch IC 12. Upon reception of an interrupt signal via the interrupt signal line 122, the main control unit 15 acquires the presence/absence of a touch operation on the electrostatic touch panel 11, the presence/absence of an improper touch operation, and position coordinate information via an I2C interface.

The operation of the electrostatic touch IC 12 will be describe below.

Figure 11:
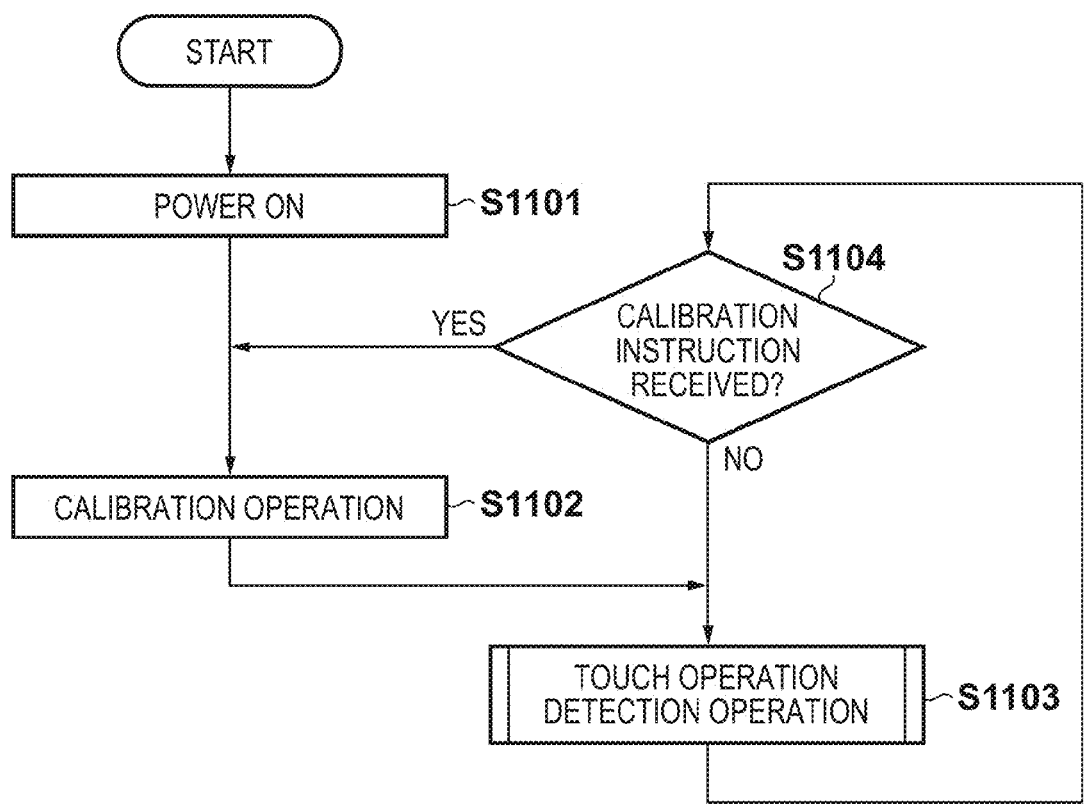
FIG. 11 is a flowchart showing an overview of the overall operation of an electrostatic touch IC.

FIG. 11 is a flowchart showing an overview of the overall operation of the electrostatic touch IC 12. When the MFP 1900 is activated by turning on the power switch (step S1101), the electrostatic touch IC 12 executes baseline value calibration processing of the electrostatic touch panel 11 (step S1102).

Figure 12:
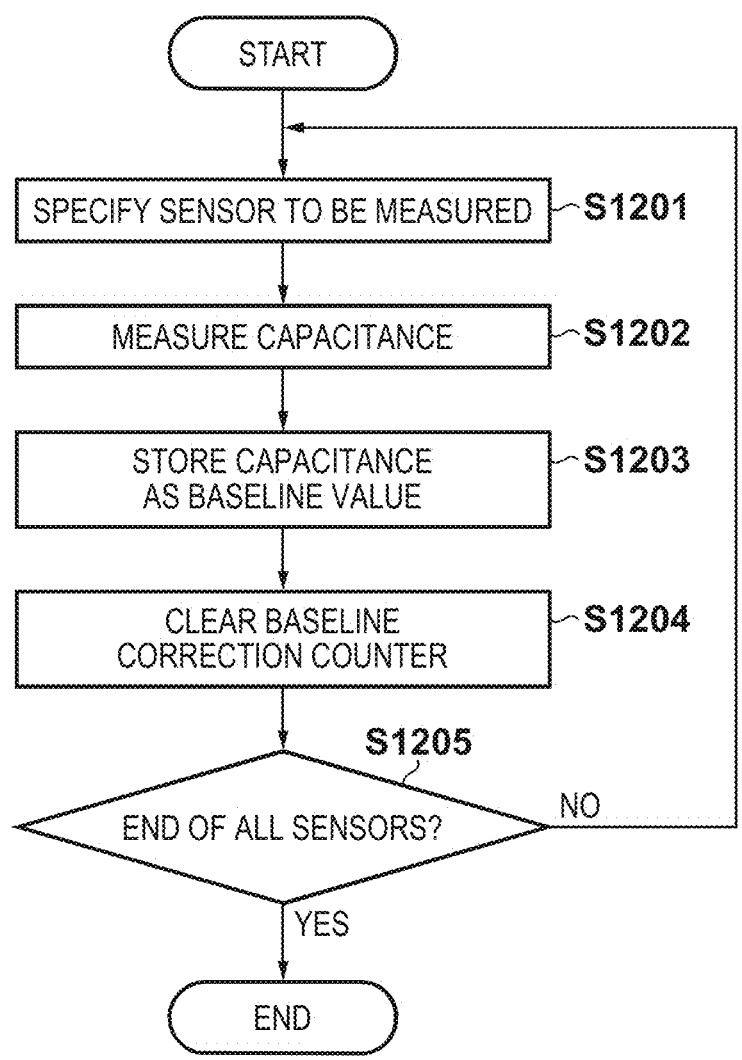
FIG. 12 is a flowchart showing the sequence of calibration processing in step S1102.

FIG. 12 is a flowchart showing the sequence of the calibration processing in step S1102 in FIG. 11. In step S1201, the electrostatic touch IC 12 specifies an electrostatic sensor pattern as a capacitance measurement target from the 14 X-coordinate electrostatic sensor patterns used to detect a touch operation position in the X direction. Also, the electrostatic touch IC 12 specifies an electrostatic sensor pattern as a capacitance measurement target from the 11 Y-coordinate electrostatic sensor patterns used to detect a touch operation position in the Y direction.

In step S1202, the electrostatic touch IC 12 measures capacitances of the specified electrostatic sensor patterns. In step S1203, the electrostatic touch IC 12 stores, for respective sensor patterns, the measured capacitance values as those (baseline values, reference values) when no operation is made on the electrostatic touch panel 11 in the RAM 85. In step S1204, the electrostatic touch IC 12 clears baseline value correction counters arranged for respective sensor patterns in association with the electrostatic sensor patterns as the current targets. The electrostatic touch IC 12 determines in step S1205 whether or not the counters for all the electrostatic sensor patterns are cleared. If not all the counters are cleared, the electrostatic touch IC 12 repeats the processing from step S1201.

After completion of the calibration processing in step S1102, the electrostatic touch IC 12 measures capacitances of the respective electrostatic sensor patterns to detect a user's touch operation on the electrostatic touch panel 11 (step S1103). While the user operates the MFP 1900 for the purpose of, for example, a print operation, the processing in step S1103 in FIG. 11 is basically repeated (NO in step S1104 to step S1103). If the electrostatic touch IC 12 determines that a calibration instruction is sent from the main control unit 15 to the electrostatic touch IC (YES in step S1104), it executes the calibration processing in step S1102. The calibration instruction from the main control unit 15 to the electrostatic touch IC 12 will be described later.

The processing in step S1103 in FIG. 11 will be described below.

Figure 13:
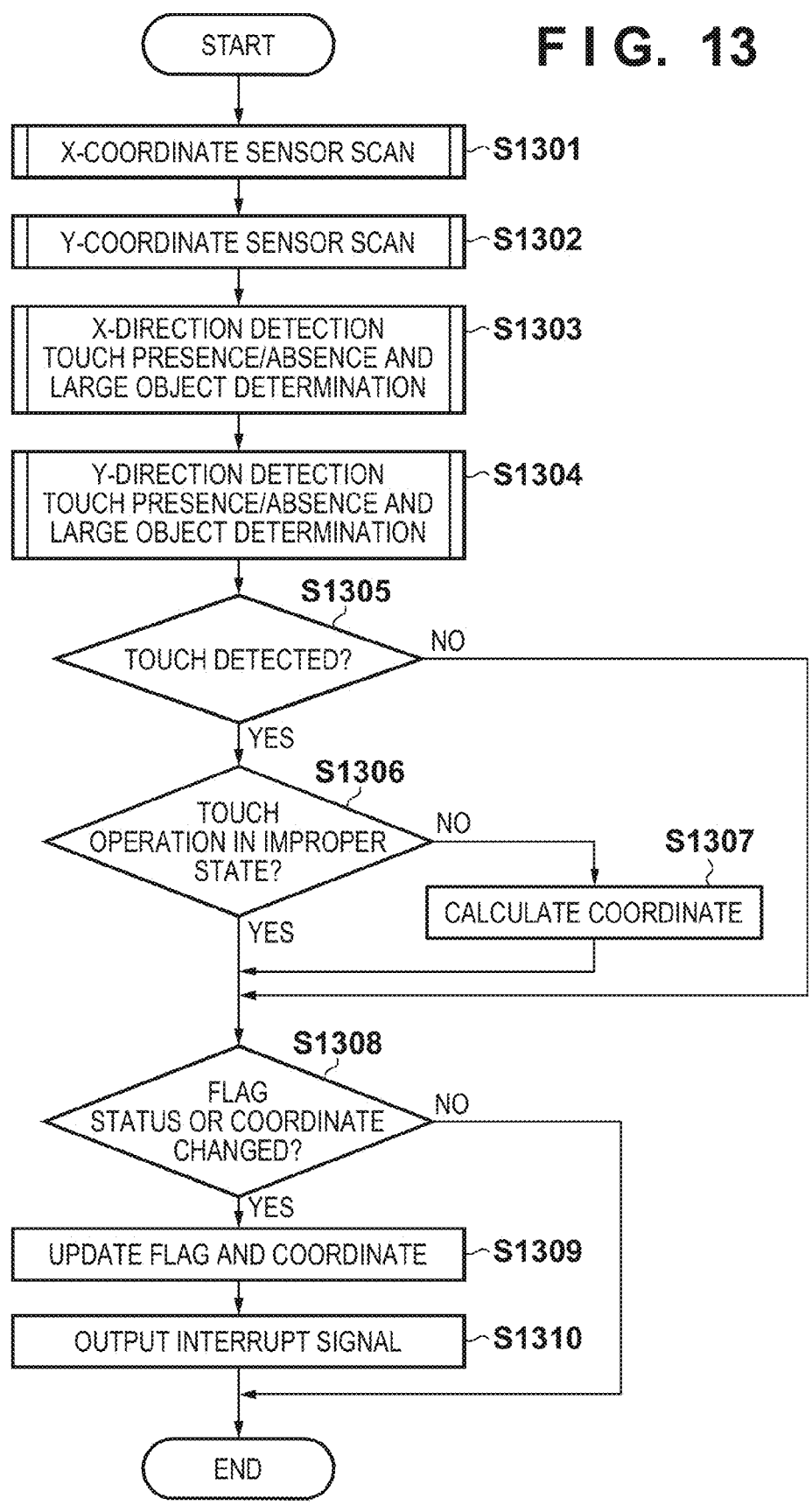
FIG. 13 is a flowchart showing the sequence of detection operation of a user's touch operation in step S1103.

FIG. 13 is a flowchart showing the sequence of the detection processing of a user's touch operation in step S1103. In step S1301, the electrostatic touch IC 12 sequentially measures capacitances of the 14 electrostatic sensor patterns of the X-coordinate detection sensors.

Figure 14:
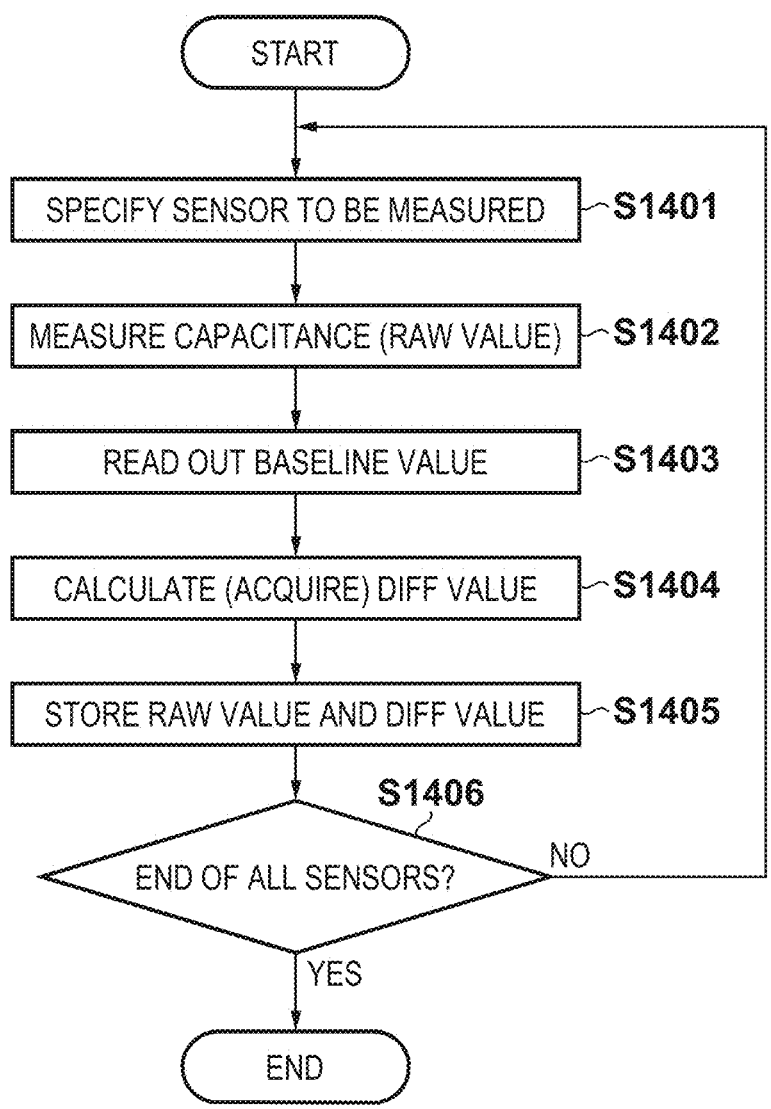
FIG. 14 is a flowchart showing the sequence of capacitance measurement processing for an X-coordinate detection electrostatic sensor pattern in step S1301.

FIG. 14 is a flowchart showing the sequence of the capacitance measurement processing for the X-coordinate detection electrostatic sensor patterns in step S1301. The electrostatic touch IC 12 specifies a sensor pattern as a measurement target, and connects the analog switch 81 to the measurement target pattern (step S1401). Then, the electrostatic touch IC 12 measures a capacitance (RAW value) of the specified electrostatic sensor pattern (step S1402). The electrostatic touch IC 12 reads out the corresponding baseline value from the RAM 85 included in itself (step S1403). The electrostatic touch IC 12 acquires a DIFF value (=RAW value−baseline value) (step S1404). The electrostatic touch IC 12 writes the measured value (RAW value) and DIFF value in the RAM 85 (step S1405). The electrostatic touch IC 12 determines whether or not the processing has been executed for all the electrostatic sensor patterns (step S1406). If the electrostatic touch IC 12 determines that the electrostatic sensor patterns to be processed still remain, it repeats the processing from step S1401.

After the processing in step S1301 of FIG. 13, the electrostatic touch IC 12 sequentially measures capacitances of the 11 electrostatic sensor patterns of the Y-coordinate detection sensors in step S1302. As for the Y-coordinate detection electrostatic sensor patterns, the electrostatic touch IC 12 stores RAW values and DIFF values of all the electrostatic sensor patterns as in the processing in FIG. 14. In the subsequent processing, the electrostatic touch IC 12 determines, based on the RAW values and baseline values of all the electrostatic sensor patterns, the presence/absence of a touch operation on the electrostatic touch pane 11, and also determines whether or not an improper touch operation is made. If the electrostatic touch IC 12 determines that an improper touch operation is not made, it calculates position coordinates where the touch operation is made.

In step S1303, the electrostatic touch IC 12 determines the presence/absence of a touch operation on the electrostatic touch panel 11 and the presence/absence of an improper touch operation in association with the X-coordinate detection electrostatic sensor patterns. Furthermore, in step S1304, the electrostatic touch IC 12 determines the presence/absence of a touch operation on the electrostatic touch panel 11 and the presence/absence of an improper touch operation in association with the Y-coordinate detection electrostatic sensor patterns.

Figure 15:
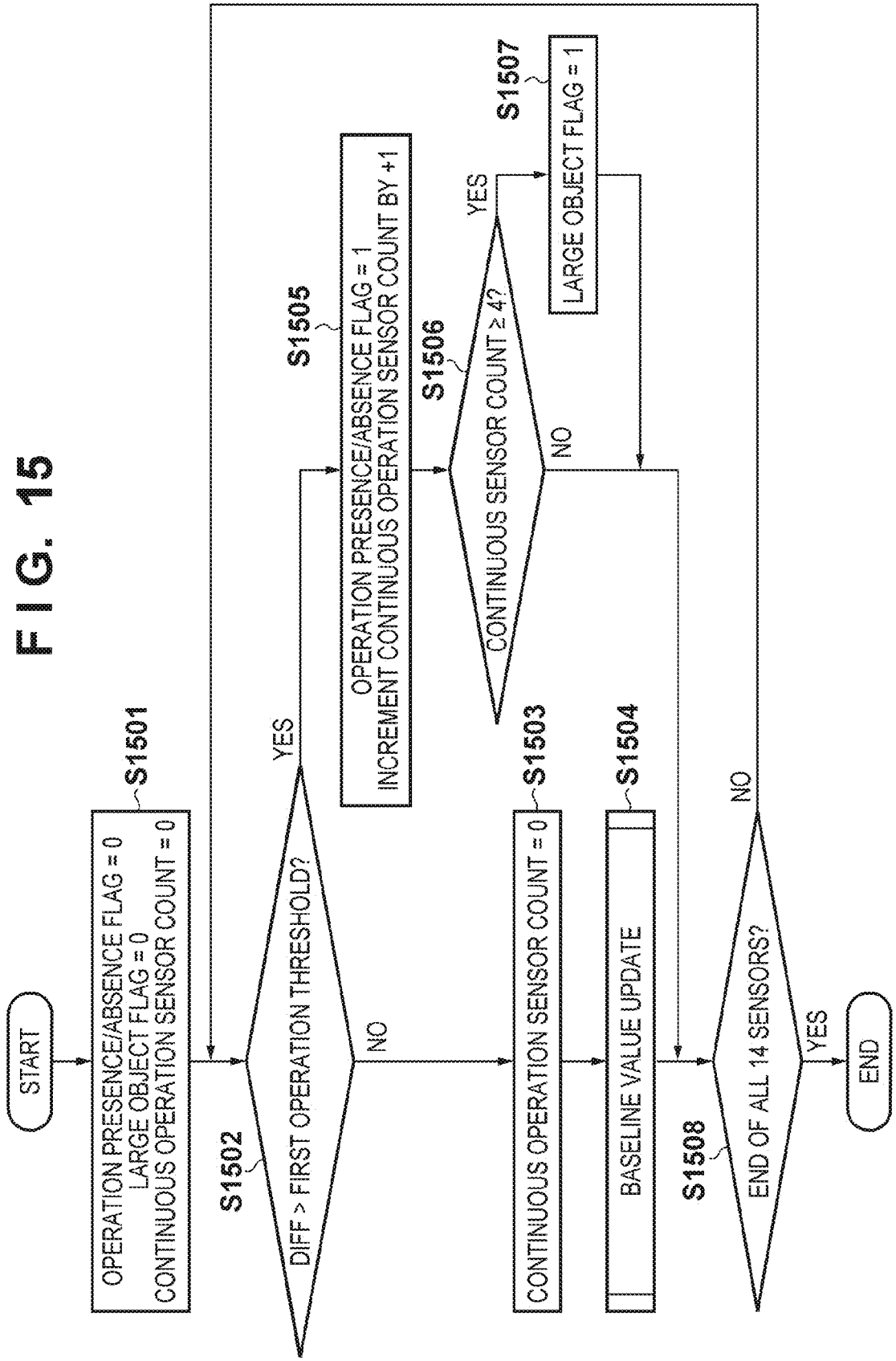
FIG. 15 is a flowchart showing the sequence for determining the presence/absence of a touch operation on the electrostatic touch panel and determining an improper touch operation in step S1303.

FIG. 15 is a flowchart showing the sequence of the processing for determining the presence/absence of a touch operation on the electrostatic touch panel 11 and the presence/absence of an improper touch operation in step S1303. FIG. 15 shows the processing related to the X-coordinate detection electrostatic sensor patterns, and the same processing applies to the Y-coordinate detection electrostatic sensor patterns in step S1304.

In this embodiment, when measured values of capacitances for electrostatic sensor patterns corresponding to a determined touch operation are larger than a threshold (operation threshold), the number of neighboring electrostatic sensor patterns has an upper limit. That is, when the upper limit number is exceeded, it is determined that a touch operation is made by an unexpectedly large substance (a palm or the like; to be referred to as a large object hereinafter), and an improper touch operation is determined. In this embodiment, when four or more neighboring X- or Y-coordinate detection electrostatic sensor patterns are continuously detected, it is determined that an improper touch operation is made.

In step S1501, the electrostatic touch IC 12 clears an operation presence/absence flag, large object flag, and continuous operation sensor count in the RAM 85. In this case, when it is determined that no operation is made on the electrostatic touch panel 11, "0" is set in the operation presence/absence flag; when it is determined that a touch operation (that of the finger or the like) is made on the electrostatic touch panel 11, "1" is set in that flag. The large object flag normally assumes "0", and "1" is set when it is determined that an improper touch operation is made. The continuous operation sensor count is a counter, which is sequentially incremented when a DIFF value (to be described later) is larger than the operation threshold.

The electrostatic touch IC 12 determines in step S1502 whether or not the DIFF values stored in step S1403 exceed a predetermined first operation value. If the electrostatic touch IC 12 determines that the DIFF values do not exceed the first operation threshold, it clears the continuous operation sensor count to "0" (step S1503). After that, in step S1504, the electrostatic touch IC 12 executes baseline value update processing required to reflect a change in ambient environment (temperature or the like) of the MFP (step S1504). The baseline value update processing will be described later.

On the other hand, if the electrostatic touch IC 12 determines that the DIFF values exceed the first operation threshold, it sets "1" in the operation presence/absence flag, and increments the continuous operation sensor count by 1 (step S1505). The electrostatic touch IC 12 determines in step S1506 whether or not the continuous operation sensor count is not less than 4. If the electrostatic touch IC 12 determines that the count is not less than 4, it determines that an improper touch operation is made, and sets "1" in the large object flag (step S1507). The electrostatic touch IC 12 determines in step S1508 whether or not the processing in FIG. 15 has been executed for all the X-direction detection electrostatic sensor patterns. If the electrostatic touch IC 12 determines that the sensor patterns to be processed still remain, it repeats the processing from step S1502. If the electrostatic touch IC 12 determines that the processing has been executed for all the electrostatic sensor patterns, it stores the results of the operation presence/absence flag, large object flag, and continuous operation sensor count in the RAM 85.

In step S1305 of FIG. 13, the electrostatic touch IC 12 determines the presence/absence of a touch operation based on the operation presence/absence flag. For example, if sensor patterns corresponding to the operation presence/absence flag="1" are detected, the electrostatic touch IC 12 determines the presence of a touch operation. If no sensor pattern corresponding to the operation presence/absence flag="1" is detected, the electrostatic touch IC 12 determines the absence of a touch operation, and the process jumps to step S1308. If the presence of a touch operation is determined, the electrostatic touch IC 12 determines in step S1306 based on the large object flag whether or not an improper touch operation is made. For example, when the large object flag is "1", the electrostatic touch IC 12 determines that an improper touch operation is made, and the process advances to step S1308. If the electrostatic touch IC 12 determines that no improper touch operation is made, it calculates in step S1307 position coordinates of the touch operation based on the measured values of the capacitances of the sensor patterns measured in step S1402. The electrostatic touch IC 12 calculates the position of the touch operation based on the DIFF values of the X- and Y-coordinate direction sensor patterns. For example, X- and Y-axis coordinates of the X- and Y-axis direction electrostatic sensor patterns having DIFF values exceeding the first operation threshold may be used as the position coordinates of the touch operation.

The electrostatic touch IC 12 determines in step S1308 whether or not the respective flag states or coordinates have changed compared to the previous processing of FIG. 13. If the electrostatic touch IC 12 determines that the flag states or coordinates have changed, it updates the position coordinates of the touch operation in the RAM 85 by the values calculated in step S1307. In step S1310, the electrostatic touch IC 12 outputs an interrupt signal to the main control unit 15 via the interrupt signal line 122. In this embodiment, the series of processes shown in FIG. 13 are executed for about 20 msec. On the other hand, if the electrostatic touch IC 12 determines in step S1308 that the respective flag states have not changed compared to the previous processing of FIG. 13, the processing ends.

Figure 16:
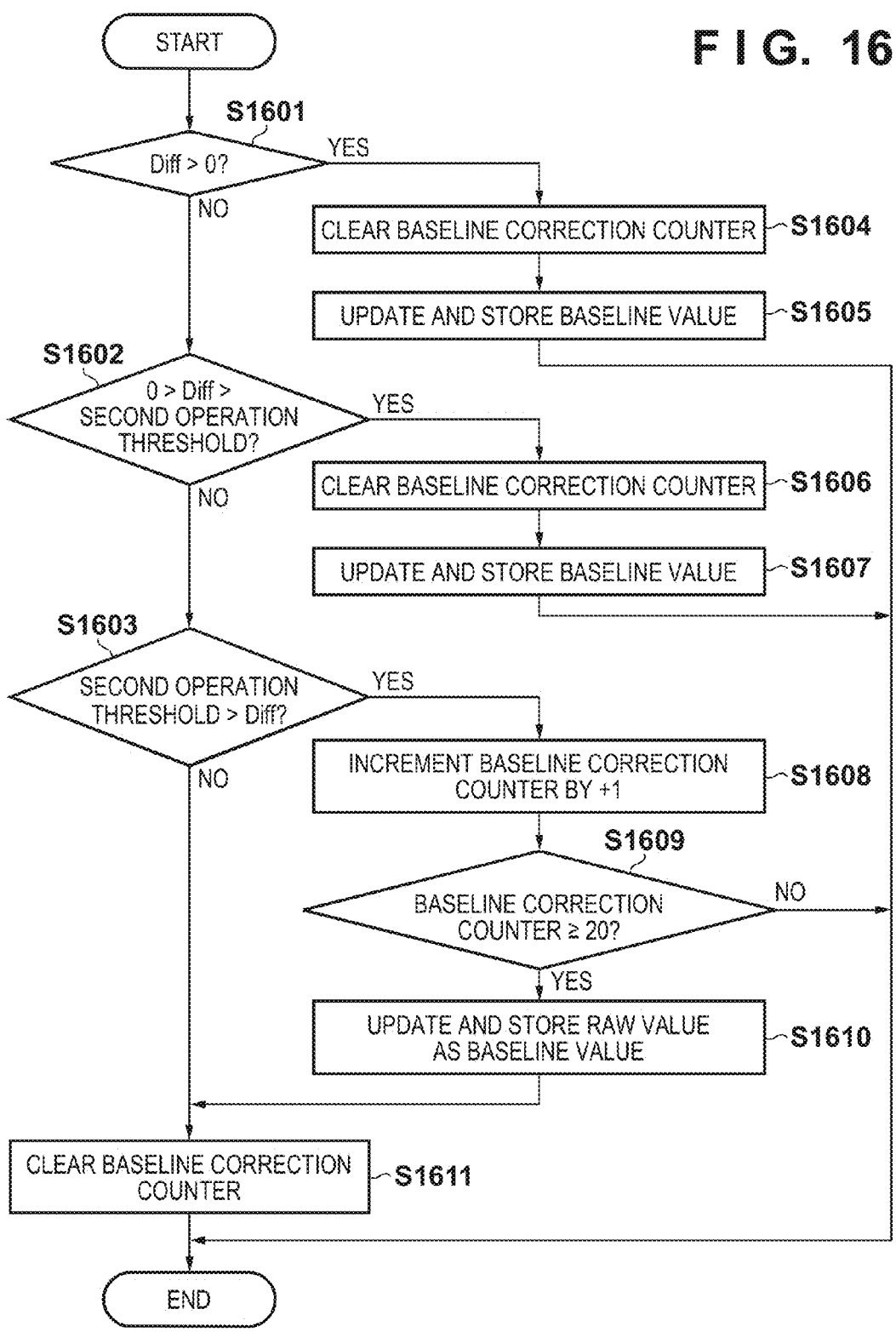
FIG. 16 is a flowchart showing the sequence of baseline value update processing in step S1504.

FIG. 16 is a flowchart showing the sequence of the baseline value update processing in step S1504 of FIG. 15. As described above using FIG. 15, the baseline value update processing is executed when the DIFF values do not exceed the first operation threshold (not more than the first operation threshold) in step S1502. In this embodiment, the baseline values are updated to cope with changes of capacitance values which may be generated even for a non-operation state with respect to the electrostatic touch panel 11 due to a change in ambient temperature or the like of the MFP. That is, the baseline value update processing in step S1504 is executed to adjust baseline values to fit the ambient environment when the baseline values have varied due to the ambient temperature or the like after the calibration processing in step S1102.

The electrostatic touch IC 12 determines in step S1601 whether or not the DIFF values exceed the baseline values. In FIG. 16, the baseline value is equal to a capacitance value="0", and is also "0" in the following description. If the electrostatic touch IC 12 determines that the DIFF values exceed "0", the RAW values are larger than the baseline value in the current state. In this case, the electrostatic touch IC 12 clears a baseline value correction counter in step S1604. The baseline value correction counter counts the number of continuous RAW values which fall below the baseline values, and is stored in the RAM 85. In step S1605, the electrostatic touch IC 12 adds the DIFF values to the baseline value "0" to update the baseline values, and stores the updated baseline values in the RAM 85. Next DIFF values are calculated (acquired) based on the updated baseline values. Values to be added to the baseline values in step S1605 need not be the DIFF values, and a predetermined value may be added.

If the electrostatic touch IC 12 determines in step S1601 that the DIFF values fall below the baseline value "0", the RAW values are smaller than the baseline value in the current state. In this case, the electrostatic touch IC 12 determines in step S1602 whether or not the DIFF values are smaller than 0 and are larger than a second operation threshold. If the electrostatic touch IC 12 determines that the DIFF values are smaller than 0 and are larger than the second operation threshold, it clears the baseline value correction counter in step S1606. In step S1607, the electrostatic touch IC 12 subtracts absolute values of the DIFF values from the current baseline value, updates the differences as new baseline values, and stores them in the RAM 85. The next DIFF values are calculated (acquired) based on these updated baseline values. Values to be subtracted from the baseline values in step S1607 need not be the DIFF values, and a predetermined value may be subtracted.

If the electrostatic touch IC 12 determines in step S1602 that the DIFF values are not larger than the second operation threshold, it determines in step S1603 whether or not the DIFF values fall below the second operation threshold. If the electrostatic touch IC 12 determines that the DIFF values fall below the second operation threshold, the process advances to step S1608, and it increments the baseline correction counter by "1". Then, the electrostatic touch IC 12 determines in step S1609 whether or not the baseline correction counter indicates 20 times or more.

The state in which the DIFF values fall below the second operation threshold will be described later. If the electrostatic touch IC 12 determines in step S1609 that the baseline correction counter indicates 20 times or more, it updates the baseline values to the current RAW values in step S1610, and clears the baseline correction counter in step S1611. The determination of step S1502 in step S1103 in the next processing is made based on the new baseline values. On the other hand, if the electrostatic touch IC 12 determines that the baseline correction counter does not indicate 20 times or more, it temporarily ends the processing of FIG. 16, and repeats the processing of step S1103 until it is determined in step S1609 that the baseline correction counter indicates 20 times or more.

Note that the baseline correction counter ≤20 in step S1609 assumes a case in which the detected RAW values are influenced by external noise or the like, and the number of times can be set depending on the situation. Also, it is determined in step S1603 that the DIFF values do not fall below the second operation threshold, for example, when the DIFF values are "0". That is, since the RAW values are equal to the baseline values, the update processing of the baseline values is skipped. After that, the electrostatic touch IC 12 clears the baseline correction counter in step S1611. Note that another example of a condition in which the baseline values are not changed will be supplemented. A third operation threshold smaller than the first operation threshold when the DIFF values are larger than "0" and a fourth operation threshold larger than the second operation threshold when the DIFF values are smaller than "0" are defined in advance. Then, when the DIFF values assume values between the third and fourth operation thresholds, the baseline change processing is controlled to be skipped.

Figure 17:
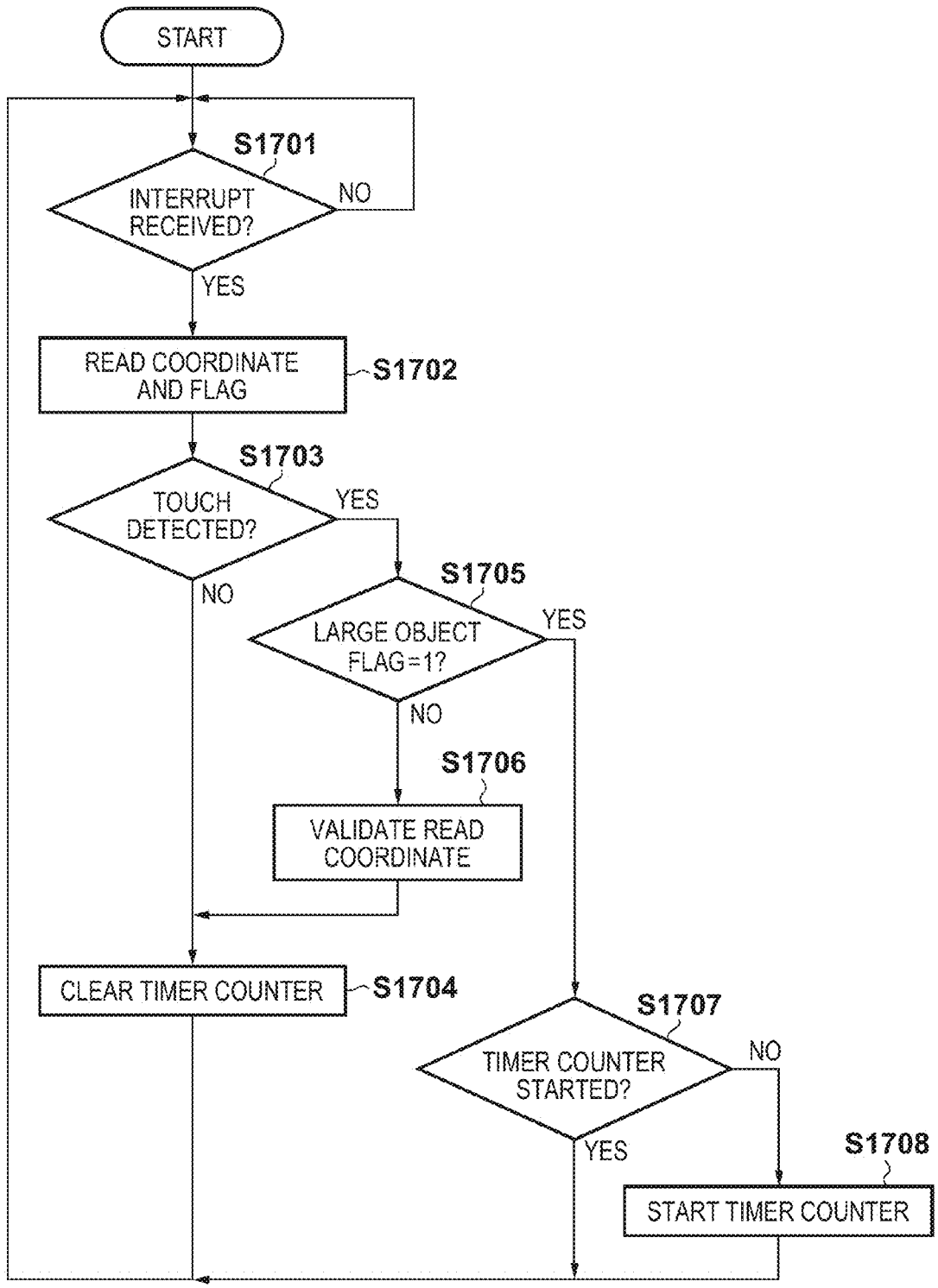
FIG. 17 is a flowchart showing the sequence of detection processing of the state of the electrostatic touch panel by a main control unit.

FIG. 17 is a flowchart showing the sequence of processing for detecting a state of the electrostatic touch panel 11 by the main control unit 15 which controls the MFP. The electrostatic touch IC 12 outputs an interrupt signal when a state of each flag of the electrostatic touch panel 11 has changed. In step S1701, the main control unit 15 waits for an interrupt signal from the electrostatic touch IC 12. Upon reception of the interrupt signal, the main control unit 15 reads out, from the electrostatic touch IC, the touch operation presence/absence flag, large object flag, and position coordinate information stored in the electrostatic touch IC 12 via the signal line 121 in step S1702.

In step S1703, the main control unit 15 determines the presence/absence of a touch operation. If the main control unit 15 determines the absence of a touch operation in step S1703, the process advances to step S1704. After that, in step S1704, the main control unit 15 clears a timer counter used to measure an elapsed time period of an improper touch operation. The timer counter is stored in the RAM 2002 in the main control unit 15.

If the main control unit 15 determines the presence of a touch operation in step S1703, it determines in step S1705 whether or not the large object flag is "1". If the main control unit 15 determines that the large object flag is not "1", since this means that a normal touch operation is made, the position coordinate information read out in step S1702 is valid, and the main control unit 15 controls the function of the MFP according to a user's instruction on the touch panel corresponding to that position coordinate information. For example, the main control unit 15 outputs a control signal to the LCD controller 14 to make a display on the LCD 13. Alternatively, the main control unit 15 outputs a control signal to the printer 2095 or scanner 1901. After that, the process advances to step S1705.

If the main control unit 15 determines in step S1705 that the large object flag is "1", since this means that an improper touch operation is made, the main control unit 15 determines in step S1707 whether or not the timer counter is started. If the main control unit 15 determines in step S1707 that the timer counter is started, it executes calibration instruction output processing in FIG. 18 (to be described later). On the other hand, if the main control unit 15 determines in step S1707 that the timer counter is not started, it starts the timer counter in step S1708. In this embodiment, if it is determined that an improper touch operation is made, the position coordinate information read out from the electrostatic touch IC 12 in step S1702 is invalid, and the control of the function of the MFP according to that position coordinate information is skipped.

Figure 18:
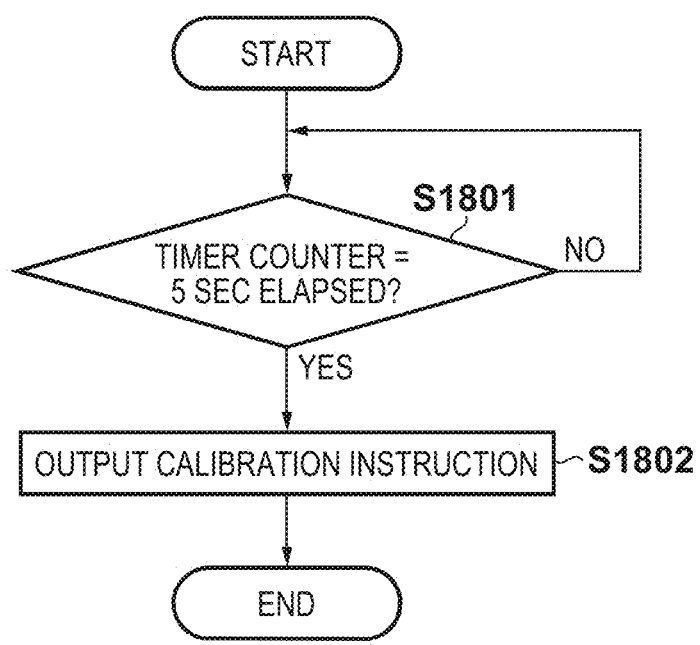
FIG. 18 is a flowchart showing the sequence of calibration instruction output processing by the main control unit.

FIG. 18 is a flowchart showing the sequence of the processing for outputting a calibration instruction from the main control unit 15 to the electrostatic touch IC 12. The calibration instruction is output to the electrostatic touch IC 12 when the main control unit 15 starts the aforementioned timer counter and a predetermined period of time elapses.

After YES is determined in step S1708 or after step S1709 in FIG. 17, the main control unit 15 determines in step S1801 in FIG. 18 whether or not a predetermined period of time (for example, 5 sec) has elapsed. If the main control unit 15 determines in step S1801 that 5 sec have elapsed, the main control unit 15 outputs a calibration instruction to the electrostatic touch IC 12 in step S1802. Upon reception of the calibration instruction, the electrostatic touch IC 12 determines in step S1104 in FIG. 11 that the calibration instruction is received, and executes calibration in step S1102.

As described above, according to this embodiment, even when the user touches the electrostatic touch panel with a large area such as the palm for a long period of time so as to change the temperatures of the adhesive layer 24 and cover lens 21, and to change the capacitances of the electrostatic sensor patterns, any determination error of a touch operation can be prevented.

Figure 9:
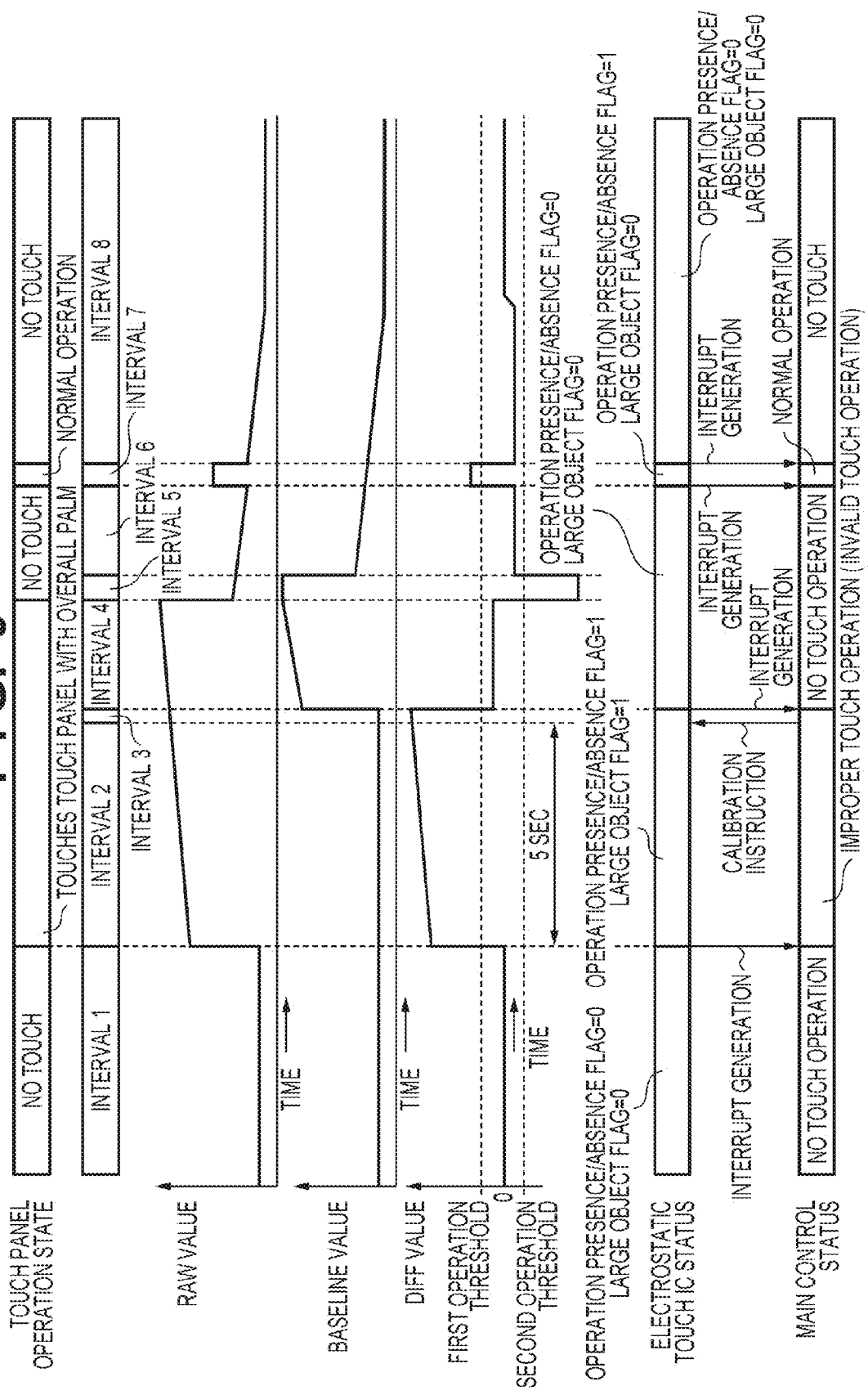
FIG. 9 is a chart for explaining respective state changes when a touch operation is made in an improper state.
Figure 10:
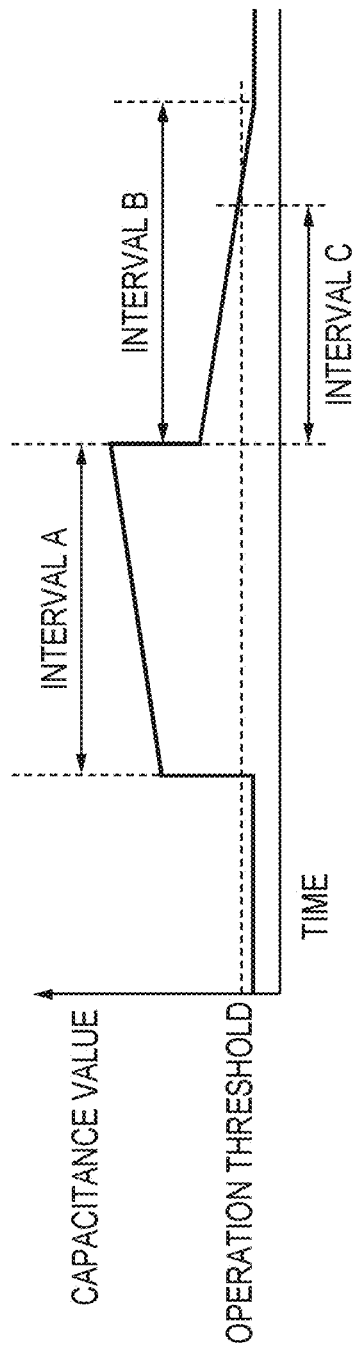
FIG. 10 is a chart for explaining a problem when the palm is placed on a touch panel for a long period of time.

State changes of the electrostatic touch IC 12 and main control unit 15 when a touch operation is made on the electrostatic touch panel 11 in an improper state will be described below with reference to FIG. 9. FIG. 9 show transitions of the RAW values, baseline values, and DIFF values of the electrostatic sensor pattern, changes of the respective flags associated with a touch operation on the electrostatic touch panel 11, and a state of a touch operation on the electrostatic touch panel 11 detected by the main control unit 15 in correspondence with a touch operation state of the electrostatic touch panel 11.

During an interval 1 in FIG. 9, for example, the MFP 1900 is a power-ON state, and nothing contacts on the surface of the electrostatic touch panel 11, that is, a non-operation state is set. At this time, since the RAW values are nearly equal to the baseline values, and the DIFF values are nearly equal to "0", the electrostatic touch IC 12 sets the operation presence/absence flag=0 and the large object flag=0. Therefore, the main control unit 15 detects the absence of a touch operation from the states of these flags.

In a state during an interval 2, the user touches the entire electrostatic touch panel 11 with the palm with a large contact area. The reaction range of the electrostatic sensor patterns is nearly equal to the entire range, and the RAW values abruptly rise far beyond the first operation threshold at an instance when the user places the palm over the touch panel. After that, the temperature of the materials around the electrostatic sensor patterns rises due to the palm temperature, and the capacitances around the electrostatic sensor patterns increase, the RAW values increase gradually.

Since the user places the palm over the touch panel, the DIFF values also abruptly rise beyond the first operation threshold together with the RAW values, and the electrostatic touch IC 12 determines the presence of a touch operation (YES in step S1502 in FIG. 15). Then, the process advances to step S1505 to set the operation presence/absence flag=1. In this case, since YES is determined in step S1502, the process does not advance to step S1504. Therefore, the baseline value update processing in step S1504 is not executed. Also, since the user places the palm over the touch panel, YES is determined in step S1506 to set the large object flag=1 in step S1507.

When the operation presence/absence flag=1 and the large object flag=1 are set, since the states of the flags have changed from the previous states, the electrostatic touch IC 12 outputs an interrupt signal to the main control unit 15. The main control unit 15 detects that an improper touch operation is made by reading out the respective flag states of the electrostatic touch IC 12.

In a state during an interval 3, since the state of the improper touch operation continued for 5 sec during the interval 2, the main control unit 15 outputs a calibration instruction to the electrostatic touch IC 12, and the calibration is executed. An operation time of the calibration itself is very short since the capacitances of the electrostatic sensor patterns are measured once and are stored as baseline values. After completion of the calibration, since the RAW values in a state in which the user places the palm over the touch panel are adopted as the baseline values, the DIFF values are nearly equal to 0. As a result, the operation presence/absence flag=0 and the large object flag=0 are set, and the main control unit 15, which reads out these flag states detects the absence of a touch operation. In practice, since an improper touch operation is made, it is an invalid operation, and is detected as the absence of a touch operation. Hence, no problem is posed in terms of an actual operation of the MFP 1900.

An interval 4 is a state after completion of the calibration. Since the user keeps touching the electrostatic touch panel 11 with the palm, the rise of the RAW values continues until the temperature of the electrostatic touch panel 11 reaches the palm temperature. However, since the capacitances do not abruptly increase, the DIFF values never exceed the operation threshold. Therefore, NO is determined in step S1502, and the baseline value update processing in step S1504 is executed. As a result, since the baseline values follow the RAW values, the DIFF values become nearly "0". For this reason, since the operation presence/absence flag=0 and the large object flag=0 are set, the main control unit 15, which reads out the flag states, continuously detects the absence of a touch operation. In this case, since the flag states of the electrostatic touch IC 12 have changed from the previous states, an interrupt signal is output to the main control unit 15. Then, the main control unit 15 reads out the flag states, and detects the absence of a touch operation.

In a state during an interval 5, the user releases the palm from the electrostatic touch panel 11. Since the capacitance corresponding to the palm disappears, the RAW values abruptly fall. However, since the temperature of the electrostatic touch panel 11 does not abruptly fall, the RAW values begin to gradually decrease. As for the DIFF values, the RAW values largely fall below the baseline values, and assume minus values. In this case, the DIFF values are smaller than the second operation threshold. That is, NO is determined in step S1603. When this determination continues 20 times, the baseline values are updated to the RAW values.

During the interval 5, since the baseline values used as reference values upon detection of a touch operation are updated, a touch operation with respect to the electrostatic touch panel 11 cannot be normally accepted. However, since the single capacitance measurement time in step S1103 is about 20 msec, and the 20 determinations require as very short as about 400 msec, no problem is posed in terms of actual use of the MFP 1900. During the interval 5, since the flag states do not change, an interrupt signal is not output to the main control unit 15.

In a state during an interval 6, the electrostatic touch panel 11 is not operated. Since the palm is released, the temperature of the electrostatic touch panel 11 continues to gradually decrease. Since the RAW values fall below the baseline values, the DIFF values assume minus values for a while, but since the baseline values are updated in step S1610, the DIFF values become nearly "0".

In a state during an interval 7, the user makes a touch operation on the electrostatic touch panel 11 with the finger. In a normal touch operation using the finger, since a contact area is small, since the materials of the adhesive layer 24 and the like, which form the electrostatic touch panel 11, are not so influenced by the temperature, and their temperatures hardly rise, an abrupt rise of the RAW values is not observed. As for the capacitance of the electrostatic sensor pattern at the position of the touch operation, the DIFF value which increases to a level that exceeds the first operation threshold is detected, and those of other patterns are nearly "0". Also, the electrostatic touch IC 12 does not determine a large object, and calculates coordinates of the position of the touch operation in step S1307. During the interval 7, the operation presence/absence flag=1 and the large object flag=0 are set. Since the flag states have changed from the previous states, an interrupt signal is output to the main control unit 15. Then, the main control unit 15 reads out these flag states, detects the presence of a touch operation, and also acquires the position coordinates of the touch operation.

In a state during an interval 8, the electrostatic touch panel 11 is not operated. Since the temperature of the electrostatic touch panel 11 gradually returns to the room temperature, the RAW values gradually decrease, and the baseline values also follow. Therefore, the DIFF values are kept to be nearly "0". During the interval 8, the operation presence/absence flag=0 and the large object flag=0 are set. Since the flag states have changed, an interrupt signal is output to the main control unit 15. Then, the main control unit 15 reads out these flag states, and detects the absence of a touch operation.

As described above, in the electronic device or the like, which uses the capacitance type touch panel as a user interface, any determination error of a touch operation caused by an improper touch operation can be prevented. When an unexpected improper touch operation is continuously made on the electrostatic touch panel 11, the calibration is executed after an elapse of the predetermined period of time (for example, 5 sec). However, even in this case, a time period in which the user cannot operate the electrostatic touch panel 11 can be very short, as in the interval 5.

The present invention has explained the capacitance type projection touch panel. However, the present invention is applicable to capacitance type touch panels of other types such as a surface type. Note that the MFP has been described as an example of an electronic device including a capacitance type touch panel. However, the present invention is also applicable to other devices including touch panels (cooking appliances such as a microwave oven, refrigerator, washing machine, terminal such as a mobile phone, and display device).

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-202012, filed Sep. 13, 2012, which is hereby incorporated by reference herein in its entirety.

What is claimed is:

1. An electronic device comprising:
   a touch panel having a plurality of electrodes;
   a measurement unit configured to measure capacitances respectively caused by the plurality of electrodes; and
   a first determination unit configured to determine that the user operation is performed on the touch panel, in a case where a difference between a measured value measured by the measurement unit and a reference value is larger than a threshold;
   a second determination unit configured to determine that the user operation is an improper operation, in a case where said first determination unit determines that the user operation is performed on the touch panel and a number of electrodes, in which the difference between each measured value by said measurement unit and the reference value is larger than a threshold, is larger than a predetermined number of electrodes; and
   a control unit configured to, in a case where said second determination unit determines that the user operations is the improper operation and a state in which the difference is larger than the threshold continues for a predetermined time period, set the reference value so that the difference between the measured value by said measurement unit and a set reference value is not larger than the threshold.

2. The device according to claim 1, wherein after said control unit sets the reference value, said first determination unit determines that the user operation is not performed on the touch panel.

3. The device according to claim 1, wherein in a case where said first determination unit determines that the user operation has not been performed on the touch panel, said control unit adjusts the reference value.

4. The device according to claim 3, wherein said control unit adjusts the reference value in a different way depending on a value of the difference.

5. The device according to claim 1, wherein the reference value is a value according to a capacitance measured in a case where said electronic device is activated.

6. The device according to claim 1, wherein in a case where the measured value decreases after said second determination unit determines that the user operation is the improper operation,
   said control unit sets the reference value to the measured value and
   said first determination unit still determines that the user operation is not performed on the touch panel.

7. A control method of an electronic device, which comprises a touch panel having a plurality of electrodes, the method comprising:
   a measuring step of measuring capacitances respectively caused by the plurality of electrodes; and
   a first determining step of determining that the user operation is performed on the touch panel, in a case where a difference between a measured value measured in the measuring step and a reference value is larger than a threshold;
   a second determining step of determining that the user operation is an improper operation, in a case where it is determined in the first determining step that the user operation is performed on the touch panel and a number of electrodes, in which the difference between each measured value measured in the measuring step and the reference value is larger than a threshold, is larger than a predetermined number of electrodes; and
   a control step of, in a case where it is determined in the second determining step that the user operation is the improper operation and a state in which the difference is larger than the threshold continues for a predetermined time period, setting the reference value so that the difference between the measured value measured in the measuring step and a set reference value is not larger than the threshold.

* * * * *